US012810468B2

(12) United States Patent
Lin et al.

(10) Patent No.: US 12,810,468 B2
(45) Date of Patent: Nov. 24, 2026

(54) HAND POSE CONSTRUCTION METHOD, ELECTRONIC DEVICE, AND NON-TRANSITORY COMPUTER READABLE STORAGE MEDIUM

(71) Applicant: HTC Corporation, Taoyuan City (TW)

(72) Inventors: Ting-Wei Lin, Taoyuan City (TW); Min-Chia Wei, Taoyuan City (TW); Chien-Min Wu, Taoyuan City (TW)

(73) Assignee: HTC Corporation, Taoyuan City (TW)

( * ) Notice: Subject to any disclaimer, the term of this patent is extended or adjusted under 35 U.S.C. 154(b) by 184 days.

(21) Appl. No.: 18/530,236

(22) Filed: Dec. 6, 2023

(65) Prior Publication Data

US 2024/0193812 A1 Jun. 13, 2024

Related U.S. Application Data

(60) Provisional application No. 63/386,490, filed on Dec. 7, 2022.

(51) Int. Cl.
*G06F 3/01* (2006.01)
*G06F 1/16* (2006.01)
(Continued)

(52) U.S. Cl.
CPC ................ *G06T 7/75* (2017.01); *G06F 1/163* (2013.01); *G06F 3/014* (2013.01); *G06F 3/017* (2013.01);
(Continued)

(58) Field of Classification Search
CPC . G06T 7/75; G06T 2207/30196; G06T 7/246; G06T 7/251; G06V 40/107;
(Continued)

(56) References Cited

U.S. PATENT DOCUMENTS 8,390,577 B2 3/2013 Lemort et al.
9,697,418 B2 7/2017 Shamaie
(Continued)

FOREIGN PATENT DOCUMENTS

AU 2021455408 B2 * 5/2025 ............. G06V 40/25
CN 113421196 A 9/2021
(Continued)

OTHER PUBLICATIONS

Search machine translation of KR 2004-0042002 A to Nam, translated Nov. 5, 2025, 10 pages. (Year: 2025).*
(Continued)

*Primary Examiner* — Matthew C Bella
*Assistant Examiner* — Dennis Rosario
(74) *Attorney, Agent, or Firm* — CKC & Partners Co., LLC

(57) ABSTRACT

A hand pose construction method is disclosed. The hand pose construction method includes the following operations: capturing an image of a hand of a user from a viewing angle of a camera, wherein a hand image of the hand of the user is occluded within the image; obtaining a wrist position and a wrist direction of a wrist of the user according to a movement data of a tracking device wear on the wrist of the user; obtaining several visible feature points of the hand of the user from the image; and constructing a hand pose of the hand of the user according to the several visible feature points, the wrist position, the wrist direction, and a hand pose model.

17 Claims, 13 Drawing Sheets

1100B

(51) Int. Cl.

| | |
|---|---|
| ***G06F 3/042*** | (2006.01) |
| ***G06T 7/246*** | (2017.01) |
| ***G06T 7/73*** | (2017.01) |
| ***G06V 10/62*** | (2022.01) |
| ***G06V 40/10*** | (2022.01) |
| ***G06V 40/20*** | (2022.01) |

(52) U.S. Cl.
CPC ............ *G06F 3/0426* (2013.01); *G06T 7/246* (2017.01); *G06T 7/251* (2017.01); *G06V 10/62* (2022.01); *G06V 40/10* (2022.01); *G06V 40/107* (2022.01); *G06V 40/11* (2022.01); *G06V 40/113* (2022.01); *G06V 40/28* (2022.01); *G06T 2207/30196* (2013.01)

(58) Field of Classification Search
CPC ........ G06V 10/10; G06V 10/22; G06V 10/40; G06V 40/28; G06V 40/20; G06V 40/11; G06V 10/62; G06V 40/113; G06V 40/10; G06F 3/017; G06F 3/011; G06F 3/014; G06F 3/0346; G06F 1/163; G06F 3/0426
See application file for complete search history.

(56) References Cited

U.S. PATENT DOCUMENTS

| | | | | |
|---|---|---|---|---|
| 2010/0164862 | A1* | 7/2010 | Sullivan | G06T 7/73 345/156 |
| 2010/0215257 | A1* | 8/2010 | Dariush | G06V 10/46 382/164 |
| 2012/0119984 | A1* | 5/2012 | Sankarasubramaniam | G06V 40/50 382/165 |
| 2018/0293738 | A1* | 10/2018 | Yang | G06T 7/73 |
| 2019/0278983 | A1* | 9/2019 | Iqbal | G06V 10/82 |
| 2020/0082564 | A1* | 3/2020 | Kaczor | G06V 20/597 |
| 2020/0225761 | A1* | 7/2020 | Sinha | G06V 40/11 |
| 2022/0051145 | A1* | 2/2022 | Zhang | G06N 20/10 |
| 2024/0153133 | A1* | 5/2024 | Woo | G06T 7/11 |

FOREIGN PATENT DOCUMENTS

| | | | | | |
|---|---|---|---|---|---|
| CN | 114303156 | A | | 4/2022 | |
| CN | 117075727 | A | * | 11/2023 | G06F 3/011 |
| JP | 2017068424 | A | * | 4/2017 | |
| JP | 2017084307 | A | * | 5/2017 | |
| KR | 20040042002 | A | * | 5/2004 | G06V 10/42 |
| WO | WO-2022230221 | A1 | * | 11/2022 | G06T 7/277 |
| WO | WO-2023025181 | A1 | * | 3/2023 | G06V 40/10 |

OTHER PUBLICATIONS

Search machine translation of WO 2023/025181 A1 to Lin, translated Nov. 6, 2025, 22 pages. (Year: 2025).*
Search machine translatoion of WO-2022230221-A1 to Matsumoto, Pose Data Generation Device, Pose Data Generation Method, and Program, translated Mar. 6, 2026, 40 pages. (Year: 2026).*
Search machine translation of CN-117075727-A to Pan, Method and Device for Realizing Keyboard Input in Virtual Space, translated Jun. 20, 2026, 29 pages. (Year: 2026).*
Search machine translation of JP-2017084307-A to Hikari, Information Processing Device, Control Method Therefor, Program, and Recording Medium, translation Jun. 20, 2026, 46 pages. (Year: 2026).*
Search machine translation of JP-2017068424-A to Yohsihisa, Attitude Measuring Apparatus and Attitude Measurement Method, translated Jun. 20, 2026, 23 pages. (Year: 2026).*
The office action of the corresponding Taiwanese application No. TW112147514 issued on Oct. 15, 2024.

* cited by examiner

800

1100B
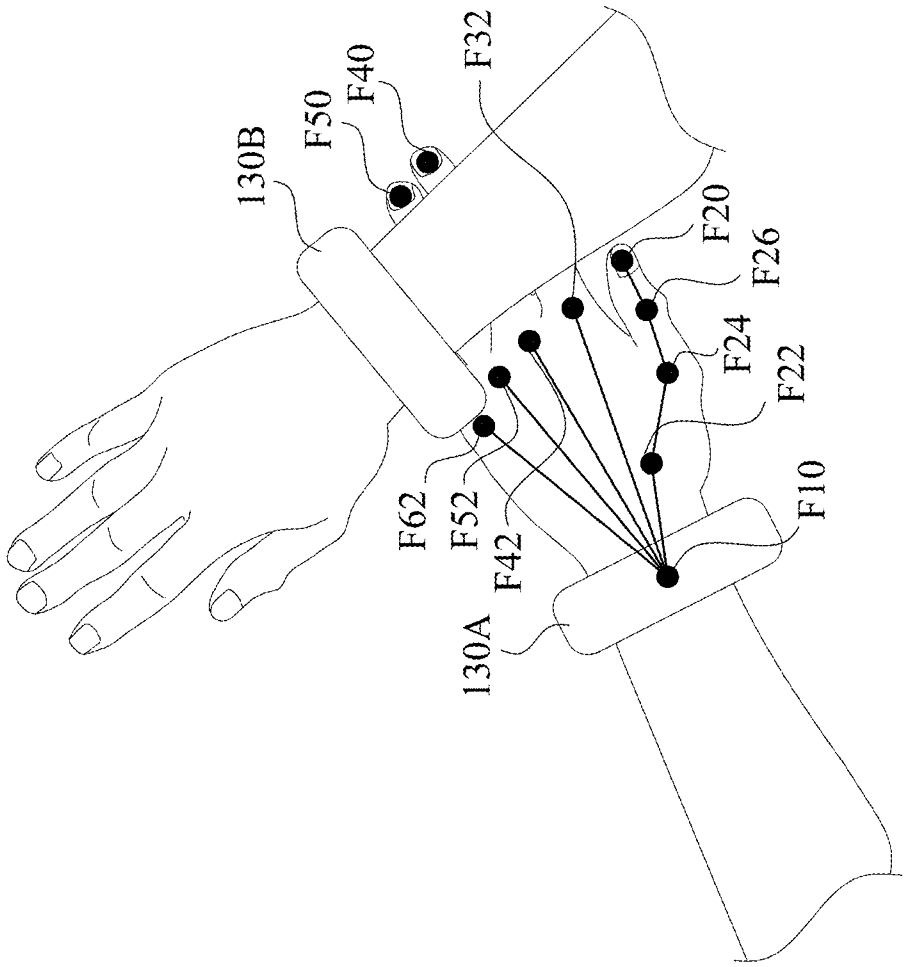
Fig. 11B
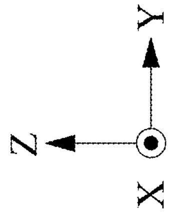

HAND POSE CONSTRUCTION METHOD, ELECTRONIC DEVICE, AND NON-TRANSITORY COMPUTER READABLE STORAGE MEDIUM

CROSS-REFERENCE TO RELATED APPLICATION

This application claims priority to U.S. Provisional Application Ser. No. 63/386,490, filed Dec. 7, 2022, which is herein incorporated by reference.

BACKGROUND

Field of Invention

The present application relates to a hand pose construction method, an electronic device, and a non-transitory computer readable storage medium. More particularly, the present application relates to a hand pose construction method, an electronic device, and a non-transitory computer readable storage medium for estimating occluded hand poses.

Description of Related Art

With the evolution of computerized environments, the use of human-machine interfaces (HMI) has dramatically increased. A growing need is identified for more natural human-machine user interface methods such as, for example, hand poses (or hand gestures) interaction to replace and/or complement traditional HMIs such as, for example, keyboards, pointing devices and/or touch interfaces, and the hand poses interaction may be applied to the VR/AR application. Several solutions for identifying and/or recognizing hand(s) poses may exist. Most of the commonly used hand poses detection and hand poses control now are realized with image detection and image analysis by computer vision. However, in computer vision, it's hard to predict hand poses when the hand in occluded by other objects. When two hands are interacting with each other or when the user is moving in a VR scene, due to different body orientations during the activity or obstruction between the lens and hands, it is inevitable for the camera to face difficulty when capturing the user's current movements, and the accuracy and stability for hand tracking would be influenced.

SUMMARY

The disclosure provides a hand pose construction method. The hand pose construction method includes the following operations: capturing an image of a hand of a user from a viewing angle of a camera, wherein a hand image of the hand of the user is occluded within the image; obtaining a wrist position and a wrist direction of a wrist of the user according to a movement data of a tracking device wear on the wrist of the user; obtaining several visible feature points of the hand of the user from the image; and constructing a hand pose of the hand of the user according to the several visible feature points, the wrist position, the wrist direction, and a hand pose model.

The disclosure provides an electronic device. The electronic device includes a camera and a processor. The camera is configured to capture an image of a hand of a user from a viewing angle of a camera, wherein a hand image of the hand of the user is occluded within the image. The processor is coupled to the camera. The processor is configured to: obtain a wrist position and a wrist direction of a wrist of the user according to a movement data of a tracking device wear on the wrist of the user; obtain several visible feature points of the hand of the user from the image; and constructing a hand pose of the hand of the user according to the several visible feature points, the wrist position, the wrist direction, and a hand pose model.

The disclosure provides a non-transitory computer readable storage medium with a computer program to execute aforesaid hand pose construction method.

It is to be understood that both the foregoing general description and the following detailed description are by examples and are intended to provide further explanation of the invention as claimed.

BRIEF DESCRIPTION OF THE DRAWINGS

Aspects of the present disclosure are best understood from the following detailed description when read with the accompanying figures. It is noted that, according to the standard practice in the industry, various features are not drawn to scale. In fact, the dimensions of the various features may be arbitrarily increased or reduced for clarity of discussion.

FIG. 11B is a schematic diagram illustrating a hand image of the user in accordance with some embodiments of the present disclosure.

DETAILED DESCRIPTION

Figure 1:
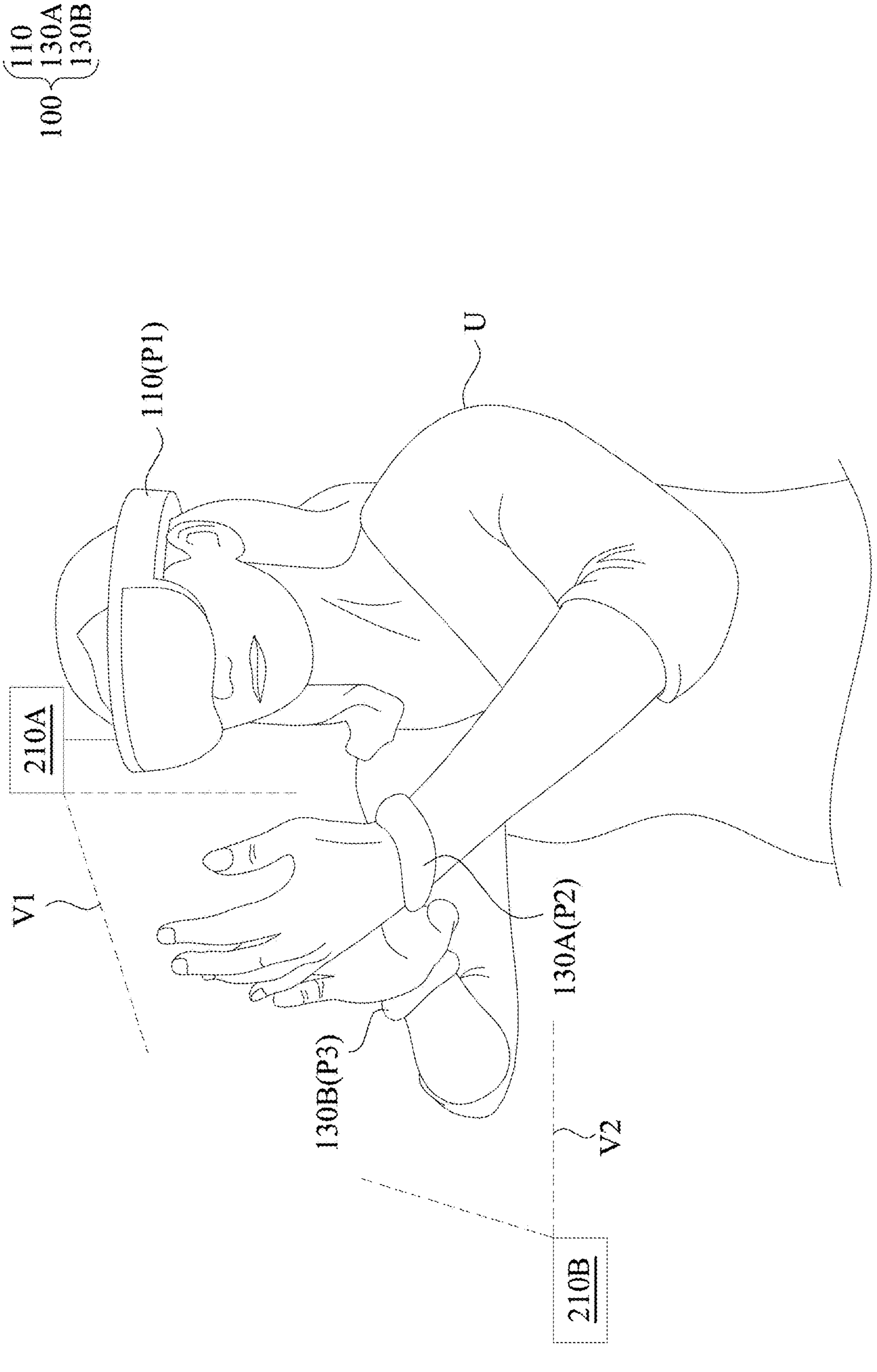
FIG. 1 is a schematic diagram illustrating a user operating a head-mounted display system of a virtual reality system in accordance with some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

It will be understood that, in the description herein and throughout the claims that follow, although the terms "first," "second," etc. may be used to describe various elements, these elements should not be limited by these terms. These terms are only used to distinguish one element from another. For example, a first element could be termed a second element, and, similarly, a second element could be termed a first element, without departing from the scope of the embodiments.

It will be understood that, in the description herein and throughout the claims that follow, the terms "comprise" or "comprising," "include" or "including," "have" or "having," "contain" or "containing" and the like used herein are to be understood to be open-ended, i.e., to mean including but not limited to.

It will be understood that, in the description herein and throughout the claims that follow, the phrase "and/or" includes any and all combinations of one or more of the associated listed items.

Reference is made to FIG. 1. FIG. 1 is a schematic diagram illustrating a user U operating a head-mounted display (HMD) system 100 of a virtual reality (VR) system in accordance with some embodiments of the present disclosure.

The HMD system 100 includes an HMD device 110, a tracking device 130A, and a tracking device 130B. As shown in FIG. 1, the user U is wearing the HMD device 110 on the head, the tracking device 130A at the left wrist, and the tracking device 130B at the right wrist.

In some embodiments, a camera is set within the HMD device 110. In some other embodiments, a camera is set at any place which could capture the image of the head and the hands of the user U together. However, whether the camera is set within the HMD device 110 or at any other places, it is evitable for the camera to capture an image with the hands being partially occluded, and the performance of the HMD system 100 would be influenced.

Figure 2:
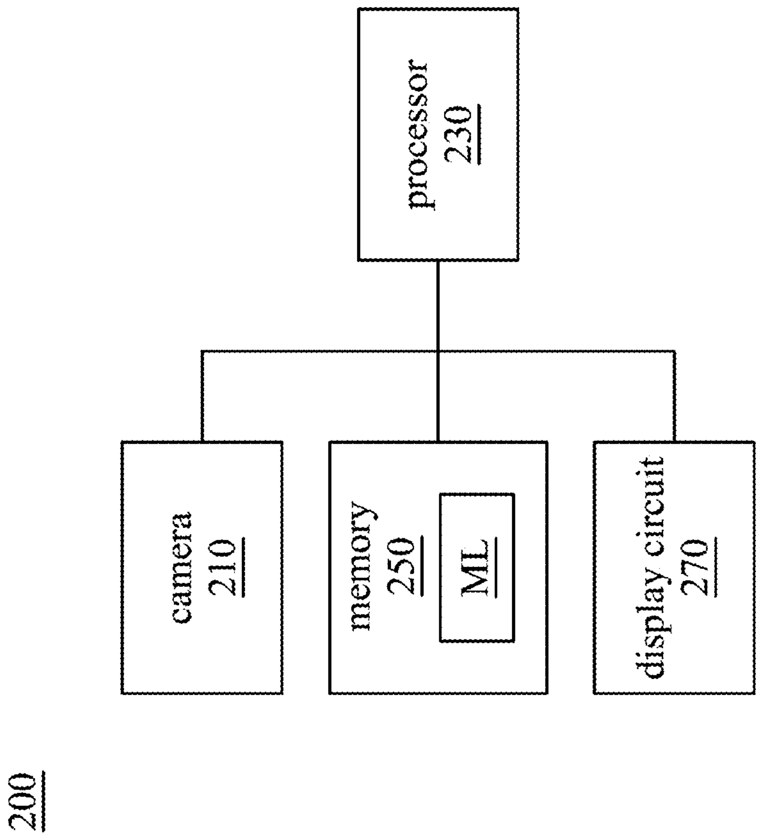
FIG. 2 is a schematic block diagram illustrating an electronic device in accordance with some embodiments of the present disclosure.

Reference is made to FIG. 2. FIG. 2 is a schematic block diagram illustrating an electronic device 200 in accordance with some embodiments of the present disclosure.

In some embodiments, the electronic device 200 may be configured to perform a SLAM system. The SLAM system includes operations such as image capturing, features extracting from the image, and localizing according to the features. The details of the SLAM system will not be described herein.

Specifically, in some embodiments, the electronic device 200 may be applied in a virtual reality (VR)/mixed reality (MR)/augmented reality (AR) system. For example, the electronic device 200 may be realized by, a standalone head mounted display device (HMD) or VIVE HMD. In detail, the standalone HMD or VIVE HMD may handle such as processing location data of position and rotation, graph processing or others data calculation.

As shown in FIG. 2, the electronic device 200 includes a camera 210, a processor 230, and a memory 250. In some embodiments, the electronic device 200 further includes a display circuit 270. One or more programs are stored in the memory 250 and configured to be executed by the processor 230, in order to perform the hand pose construction method.

The processor 230 is electrically connected to the camera 210, the memory 250, and the display circuit 270. In some embodiments, the processor 230 can be realized by, for example, one or more processing circuits, such as central processing circuits and/or micro processing circuits, but are not limited in this regard. In some embodiments, the memory 250 includes one or more memory devices, each of which includes, or a plurality of which collectively include a computer readable storage medium. The computer readable storage medium may include a read-only memory (ROM), a flash memory, a floppy disk, a hard disk, an optical disc, a flash disk, a flash drive, a tape, a database accessible from a network, and/or any storage medium with the same functionality that can be contemplated by persons of ordinary skill in the art to which this disclosure pertains.

The camera 210 is configured to capture one or more images of the real space that the electronic device 200 is operated. In some embodiments, the camera 210 may be realized by a camera circuit device or any other camera circuit with image capture functions. In some embodiments, the camera 210 may be realized by a RGB camera or a depth camera.

The display circuit 270 is electrically connected to the processor 230, such that the video and/or audio content displayed by the display circuit 270 is controlled by the processor 230.

Reference is made to FIG. 1 together. In some embodiments, the electronic device 200 in FIG. 2 may represent the HMD system 100 as illustrated in FIG. 1. In some embodiments, the camera 210 may be located at the HMD device 110 wear at the head of the user U as illustrated in FIG. 1 so as to imitate a viewing angle of the user U. In some other embodiments, the camera 210 can be located any places within the real space that the user U is operating the HMD system 100, and the camera 210 captures the images (including the head and the hands) of the user. The camera 210 includes a viewing angle for capturing the image.

For example, in one embodiment, the camera may be located at the HMD device 110 wear on the head of the user U, as the camera 210A illustrated in FIG. 1. In another embodiment, the camera may be located near the user U but not at the HMD device 110, as the camera 210B illustrated in FIG. 1.

The camera 210A includes a viewing angle V1 imitating a viewing angle of the user U. The camera 210B includes a viewing angle V2. The images are captured by the camera according to the viewing angle. From the viewing angle V1 and the viewing angle V2 as illustrated in FIG. 1, the hand image captured by the camera 210A or 210B may be occluded when the user U is moving his hands.

It should be noted that, the electronic device 200 may be a device other than the HMD device, any device which is able obtain the positions of the head and the hands of the user may be included within the embodiments of the present disclosure.

In some embodiments, the HMD device 110 and the tracking devices 130A, 130B include a SLAM system with a SLAM algorithm. With the SLAM system of the tracking devices 130A, 130B and the HMD device 110, the processor 230 may obtain the position of the HMD device 110 and the tracking devices 130A, 130B within the real space.

In some embodiments, since the user U is wearing the HMD device 110 and the tracking devices 130A, 130B, the position of the HMD device 110 may represent the position of the head of the user U, the position of the tracking device 130A is taken as the position of the left wrist of the user U, and the position of the tracking device 130B is taken as the position of the right wrist of the user U. In some embodiments, the position of the tracking device 130A is taken as the position of the feature point of the left wrist of the user U, and the position of the tracking device 130B is taken as the position of the feature point of the right wrist of the user U.

For example, as illustrated in FIG. 1, the position P1 is the position of the HMD device 110, and the position P1 is taken as the position of the feature point of the head of the user U. The position P2 is the position of the tracking device 130A, and the position P2 is taken as the position of the feature point of the left wrist of the user U. The position P3 is the position of the tracking device 130B, and the position P3 is taken as the position of the feature point of the right wrist of the user U.

It is noted that, the embodiments shown in FIG. 2 is merely an example and not meant to limit the present disclosure.

Figure 3:
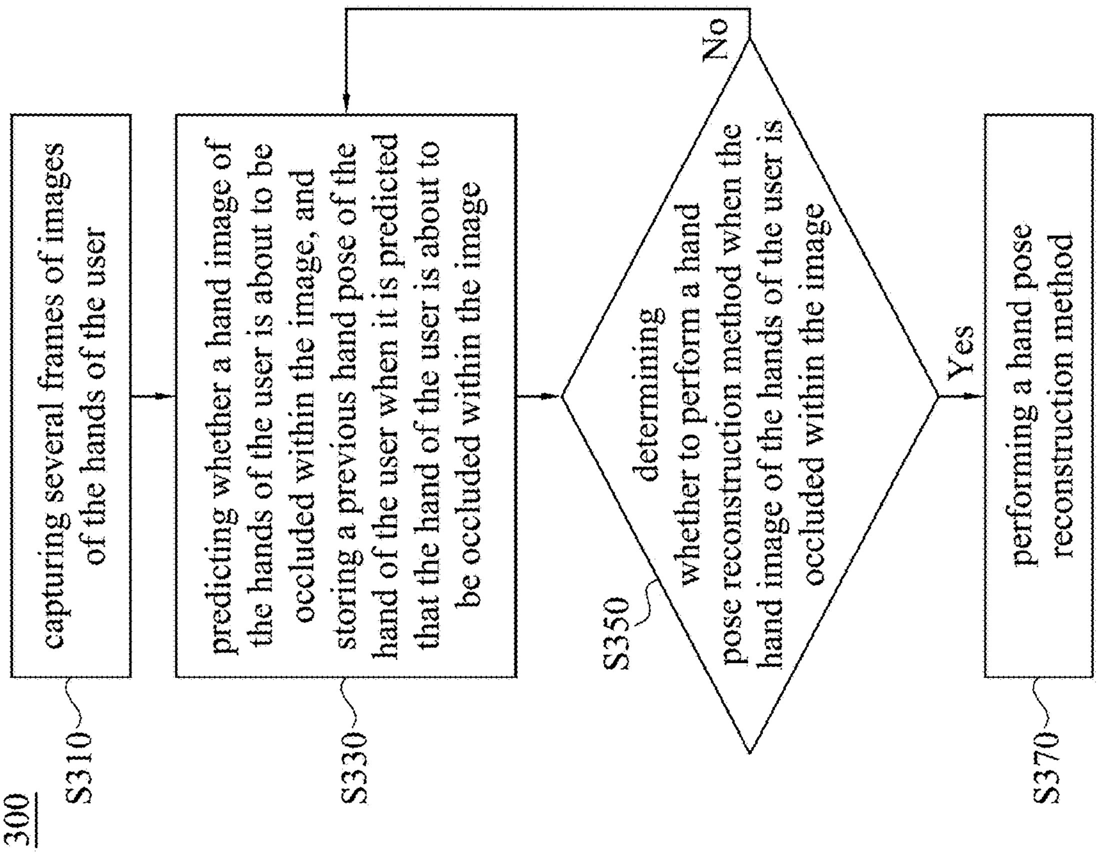
FIG. 3 is a flowchart illustrating the hand pose construction method in accordance with some embodiments of the present disclosure.

Reference is made to FIG. 3. For better understanding of the present disclosure, the detailed operation of the electronic device 200 will be discussed in accompanying with the embodiments shown in FIG. 3. FIG. 3 is a flowchart illustrating the hand pose construction method 300 in accordance with some embodiments of the present disclosure. It should be noted that the hand pose construction method 300 can be applied to an electrical device having a structure that is the same as or similar to the structure of the electronic device 200 shown in FIG. 2. To simplify the description below, the embodiments shown in FIG. 2 will be used as an example to describe the hand pose construction method 300 in accordance with some embodiments of the present disclosure. However, the present disclosure is not limited to application to the embodiments shown in FIG. 2.

As shown in FIG. 3, the hand pose construction method 300 includes operations S310 to S370.

In operation S310, several frames of images of the hands of the user are captured. In some embodiments, operation S310 is performed by the camera 210 in FIG. 2. For example, the camera 210 captures frames of images of the hands of the user U as illustrated in FIG. 1 continuously when the user U is operating the HMD system 100. According to the captured image, the processor 230 constructs hand poses of the hands of the user U continuously according to the captured images. According to the hand poses constructed, the processor 230 further operates the interactions between the user U and the virtual images or displays the constructed hand poses on the display circuit 270. Any other operations performed by the processor 230 according to the constructed hand poses may be conducted.

In operations S330, whether a hand image of the hands of the user is about to be occluded within the image is predicted, and a previous hand pose of the hands of the user is stored when it is predicted that the hand image of the hands of the user is about to be occluded within the image. In some embodiments, the operation S330 is performed by the processor 230 as illustrated in FIG. 2.

Figure 4:
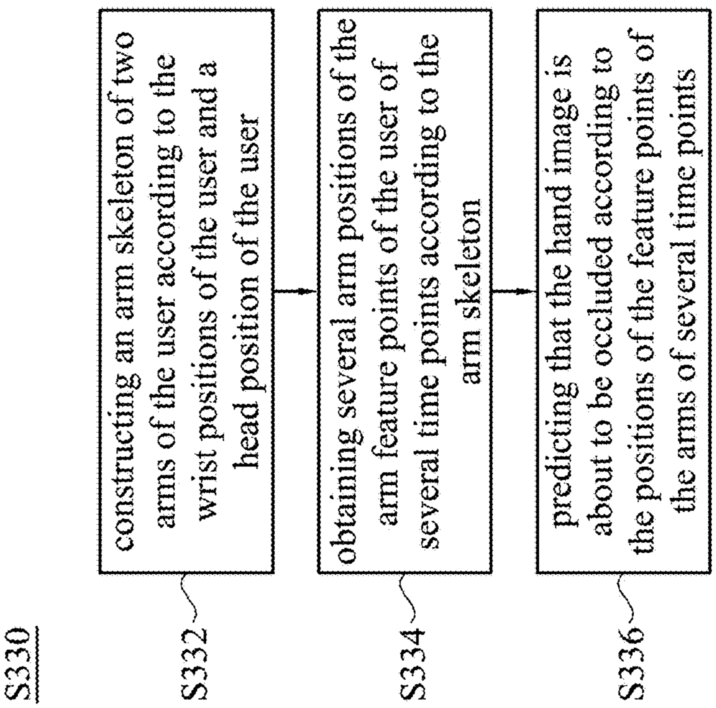
FIG. 4 is a flowchart illustrating an operation as illustrated in FIG. 3 in accordance with some embodiments of the present disclosure.

Reference is made to FIG. 4. FIG. 4 is a flowchart illustrating operation S330 as illustrated in FIG. 3 in accordance with some embodiments of the present disclosure. Operation S330 includes operations S332 to S336.

In operation S332, an arm skeleton of two arms of the user is constructed according to the wrist positions of the user and a head position of the user. In some embodiments, the arm skeleton of the two arms of the user is further constructed according to the wrist positions of the user, a head position of the user, and an arm skeleton model.

Figure 5:
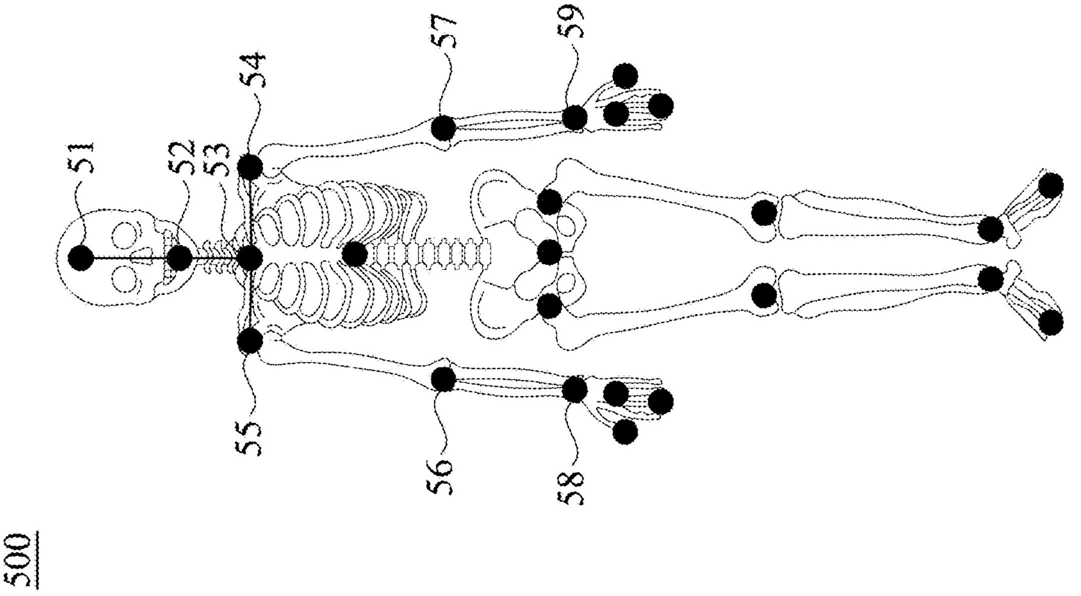
FIG. 5 is a schematic diagram illustrating a body skeleton model in accordance with some embodiments of the present disclosure.

Reference is made to FIG. 5 together. FIG. 5 is a schematic diagram illustrating a body skeleton model 500 in accordance with some embodiments of the present disclosure. As illustrated in FIG. 5, the body skeleton model 500 includes several feature points of the human body. The feature points 51 to 59 are the feature points of the arms of the human body. In some embodiments, the body skeleton model 500 further includes distances between each of the two feature points. In some embodiments, the body skeleton model 500 is stored in the memory 250 in FIG. 2. The memory 250 in FIG. 2 stores the body skeleton model 500 with different human postures and different human body shapes.

As illustrated in FIG. 5, the feature points 51 to 59 locate at the joints of the arms, the forehead, the jaw, and the chest of the user U.

Figure 6:
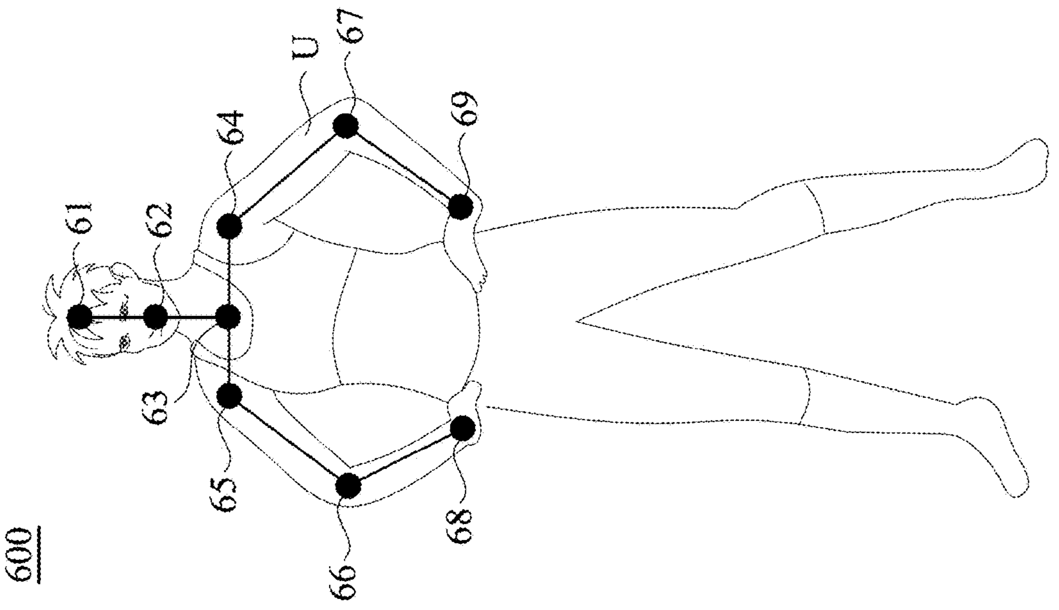
FIG. 6 is a schematic diagram illustrating an arm skeleton of the arms of the user in accordance with some embodiments of the present disclosure.

Reference is made to FIG. 6. FIG. 6 is a schematic diagram illustrating an arm skeleton 600 of the arms of the user U in accordance with some embodiments of the present disclosure. The arm skeleton 600 is constructed according to the body skeleton model 500, the position of the head of user U within the real space, and the positions of the wrists of the user U within the real space. That is, with the position of the feature point of the head of user U and the positions of the feature points of the wrists of the user U, the processor 230 may estimate the positions of the other feature points with the body skeleton model 500. In detail, the processor 230 may know the distances and the relative angles between the feature points 51 to 59 according to the body skeleton model 500, and according to the distances and the relative angles between the feature points 51 to 59, the processor may estimate the positions of the feature points 61 to 69 relative to the positions of the feature point of the head of user U and the positions of the feature points of the wrists of the user U, so as to construct the arm skeleton 600.

Figure 7:
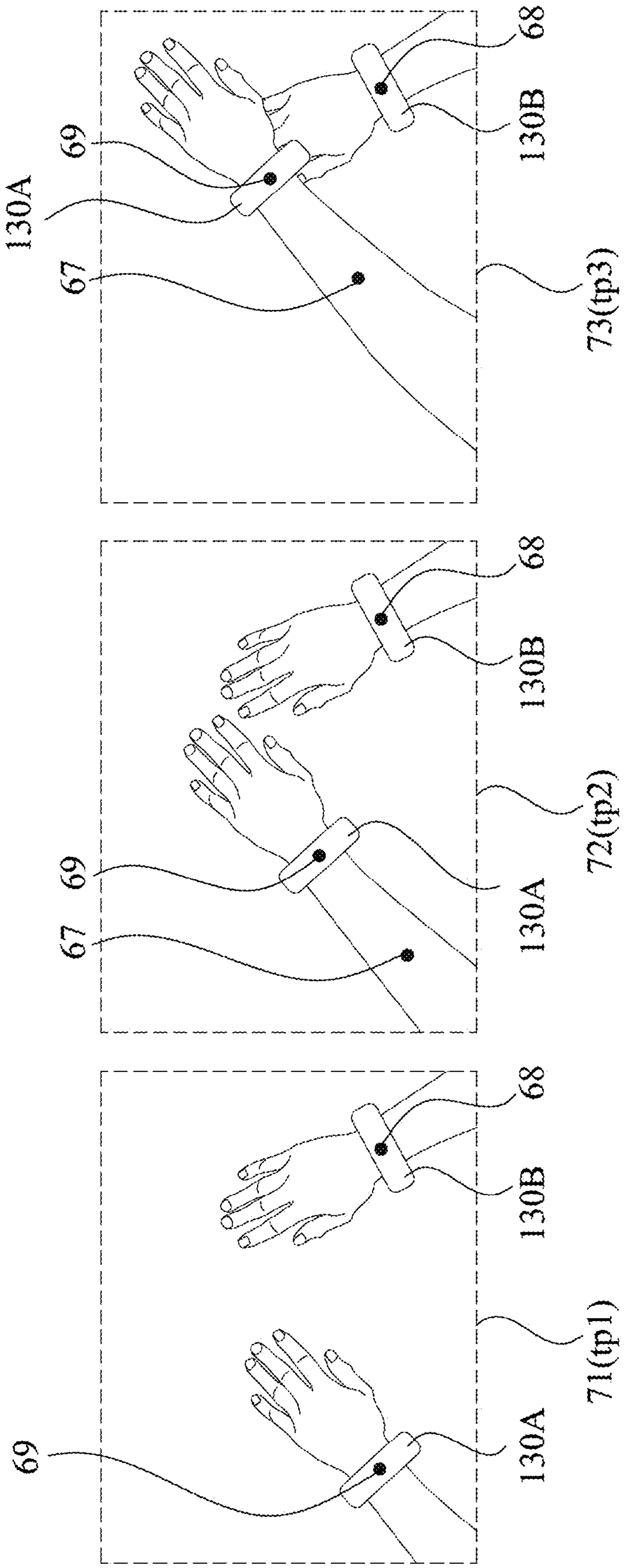
FIG. 7 is a schematic diagram illustrating an example of an operation of FIG. 3 in accordance with some embodiments of the present disclosure.

In operation S334, several arm positions of the arm feature points of the user of several time points are obtained according to the arm skeleton. That is, several positions of the feature points of the arms of the user U at several time points are obtained according to the arm skeleton. Reference is made to FIG. 7 together. FIG. 7 is a schematic diagram illustrating an example of operation S330 in accordance with some embodiments of the present disclosure.

The images 71 and 72 as shown in FIG. 7 are captured by the camera 210 as illustrated in FIG. 2. The image 71 is captured at time point tp1, and the image 72 is captured at time point tp2. According to the images 71 and 72, the positions of the feature points 67, 68, 69 of the arms of the user U at time points tp1 and tp2 are obtained according to the arm skeleton 600.

In operation S336, the hand image is about to be occluded is predicted according to the positions of the feature points of the arms of several time points. In some embodiments, whether the hands of the user U is about to be occluded is predicted according to the moving velocity and the moving direction of the arms of the user U.

For example, in an embodiment, the processor 230 as illustrated in FIG. 2 calculates the moving velocity and the moving direction of the arms of the user U according to the positions of the feature points 67, 68, 69 at time point tp1 and the positions of the feature points 67, 68, 69 at time point tp2. According to the moving direction and the moving velocity of the arms of the user U from time point tp1 to time point tp2, since the hands of the user U are moving toward each other, the processor 230 as illustrated in FIG. 2 predicts that the hands of the user U may be occluded at time point tp3. The image 73 is an image predicted by the processor 230 according to the images p71 and p72.

In some other embodiments, according to the position of the wrists of the user U, the processor 230 may predict whether the hands of the user U are moving toward an object within the real space, and the processor 230 may predict that the hand image of the user U will be occluded in the future.

Reference is made to S330 again. In some embodiments, when it is predicted that the hand image of the hands of the user is about to be occluded within the image, a previous hand pose of the hands of the user is stored.

For example, as illustrated in FIG. 7. Since it is predicted that the hand image of the hands of the user is about to be occluded, the processor 230 stores the hand pose of the hands of the user at time point tp2. In some embodiments, storing the hand pose includes storing the positions of the feature points of the hands at time point tp2. In some embodiments, storing the hand pose includes storing the distances between each two of the feature points of the hands at time point tp2. The feature points of the hands will be described in detail in FIG. 8 as follows.

Figure 8:
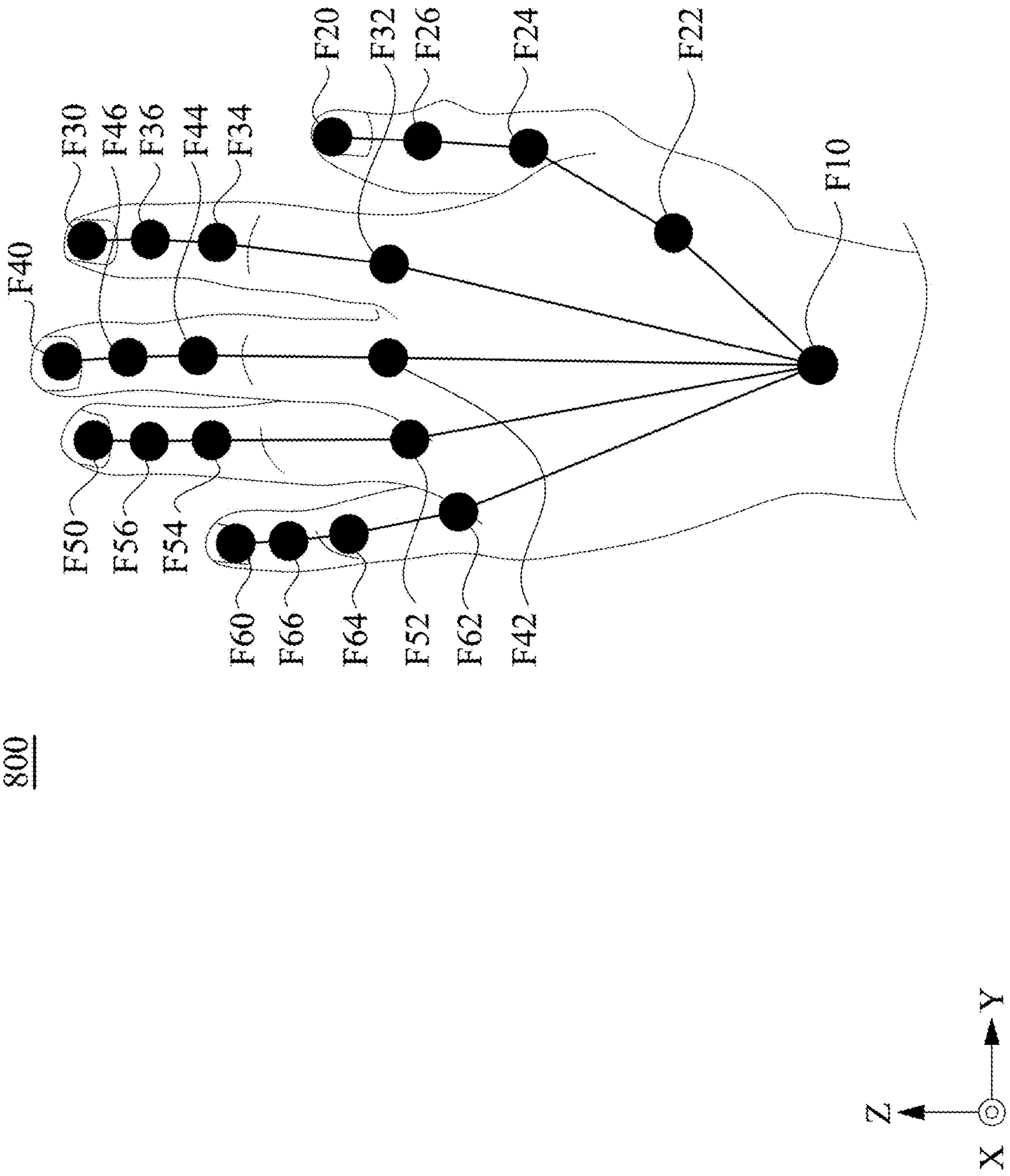
FIG. 8 is a schematic diagram illustrating a hand pose model of a left hand of the user in accordance with some embodiments of the present disclosure.

Reference is made to FIG. 8. FIG. 8 is a schematic diagram illustrating a hand pose model 800 of a left hand of the user U in accordance with some embodiments of the present disclosure. The concept of the hand pose of the right hand of the user U should be similar to that of the left hand and will not be described in detail here.

As illustrated in FIG. 8. The hand pose model 800 of the left hand of the user U includes a feature point F10 of the wrist, features points F22, F24, F26 at the joints of the thumb, a feature point F20 at the finger tip of the thumb, feature points F32, F34, F36 at the joints of the forefinger, a feature point F30 at the finger tip of the forefinger, feature points F42, F44, F46 at the joints of the middle finger, a feature point F40 at the finger tip of the middle finger, feature points F52, F54, F56 at the joints of the ring finger, a feature point F50 at the finger tip of the ring finger, feature points F62, F64, F66 at the joints of the little finger, and a feature point F60 at the finger tip of the little finger.

The feature points as mentioned above are for illustrative purposes and the embodiments of the present disclosure are not limited thereto.

In some embodiments, the hand pose model 800 is stored in the memory 250 in FIG. 2. The memory 250 in FIG. 2 stores the hand pose model 800 with different human postures and different human body shapes.

Reference is made to FIG. 7 again. In some embodiments, when the hand pose of the image 72 is stored as a previous hand pose, the positions of the feature points (for example, the feature points of F10 to F66 as illustrated in FIG. 8) and the distances between the feature points of the hands are stored in the memory 250.

Reference is made back to FIG. 3. In operation S350, it is determined whether to perform a hand pose reconstruction method when the hand image of the hands of the user is occluded within the image. In some embodiments, whether to perform a hand pose reconstruction method is determined according to a number of visible feature points, an occlusion percentage of the hand, or a significance of invisible feature points.

Figure 9:
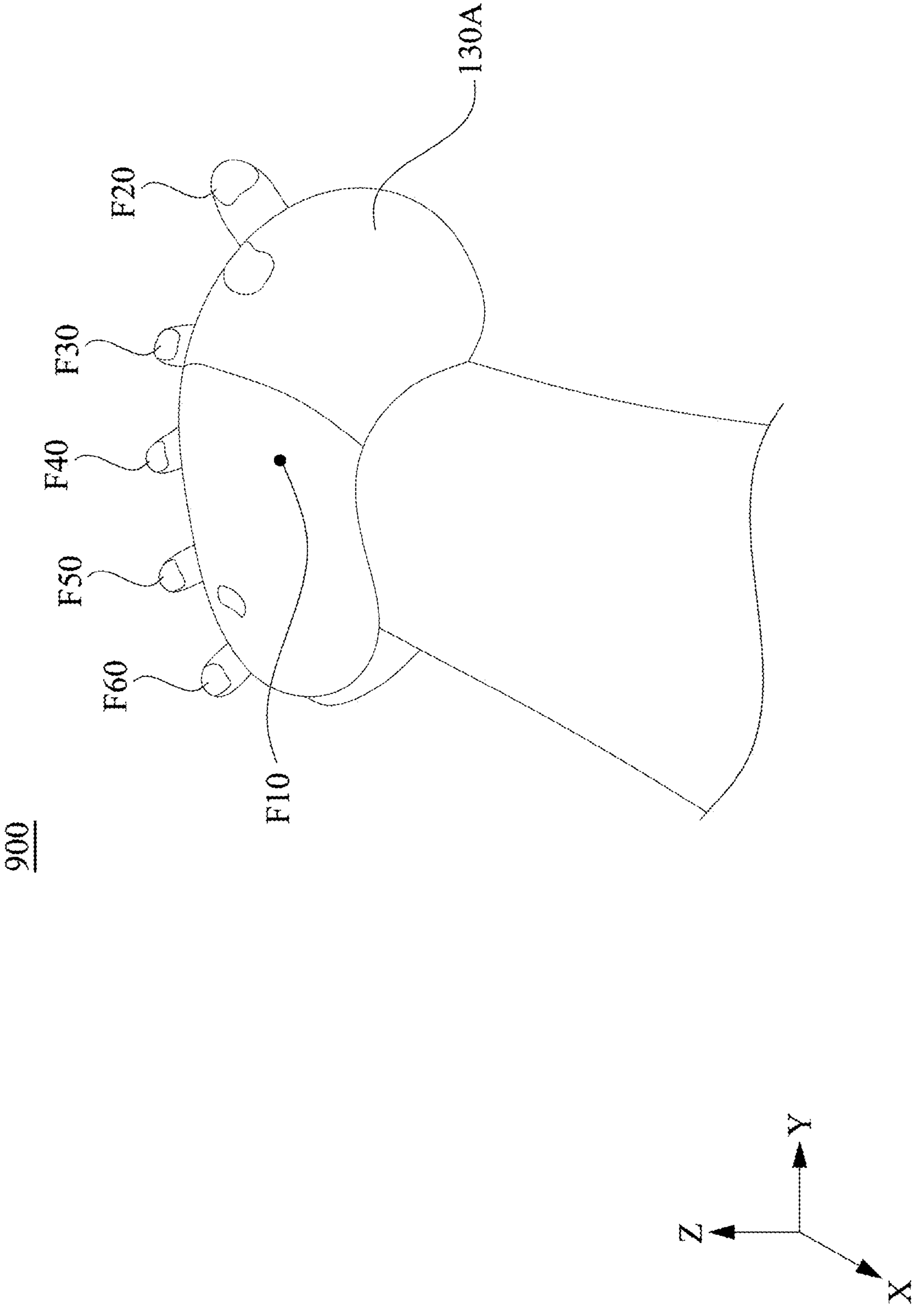
FIG. 9 is a schematic diagram illustrating hand image of the user in accordance with some embodiments of the present disclosure.

Reference is made to FIG. 9 together. FIG. 9 is a schematic diagram illustrating a hand image 900 of the user U in accordance with some embodiments of the present disclosure.

In some embodiments, when constructing the hand pose of the hands according to the hand image, the processor 230 as illustrated in FIG. 2 first searches the positions of the tracking device 130A and the tracking device 130B in the real space. The position of the tracking devices 130A is taken as the wrist position of the left wrist and the position of the tracking device 130B is taken as the wrist position of the right wrist.

After the processor 230 finds the positions of the tracking device 130A and the tracking device 130B in the real space, the processor 230 searches the area surrounding the tracking devices 130A and 130B according to the hand image captured by the camera 210 as illustrated in FIG. 2, so as to find whether the feature points of the hands exist. The feature points that can be seen from the hand image are visible feature points, and the feature points that cannot be seen from the hand image are invisible feature points.

As illustrated in FIG. 9, the hand image 900 is occluded by the tracking device 130A. The hand image 900 includes visible feature points F10, F20, F30, F40, F50, F60, and the rest of the feature points are invisible feature points. It should be noted that the position of the tracking device 130A is considered to be the position of the feature point F10, therefore the feature point F10 is taken as a visible feature point in FIG. 9.

In some embodiments, when the number of the visible feature points is less than a number threshold value, the processor 230 determines to perform the hand pose reconstruction method. In some other embodiments, when the ratio of the visible feature points is less than a ratio threshold value, the processor 230 determines to perform the hand pose reconstruction method.

In some embodiments, the processor 230 calculates an occlusion percentage of the hand, when the occlusion percentage of the hand is higher than a percentage threshold value, the processor 230 determines to perform the hand pose reconstruction method.

In some embodiments, some feature points of the hands are considered to include high significance. If the feature points with high significance are invisible, the processor 230 determines to perform the hand pose reconstruction method.

Figure 10:
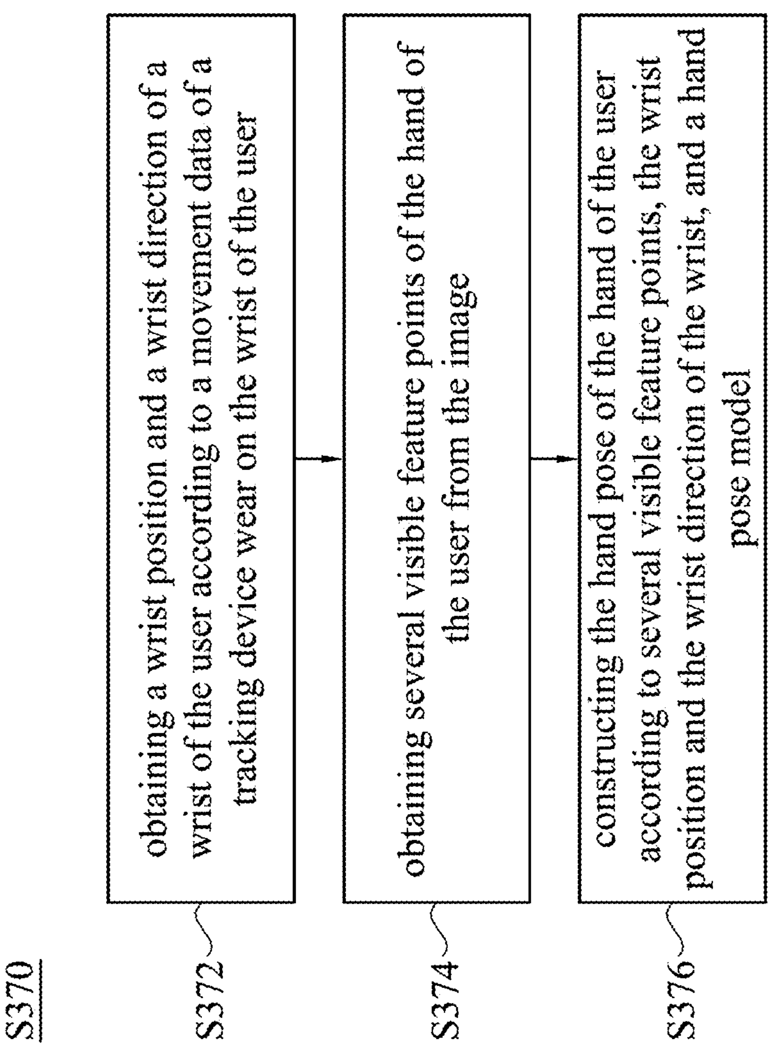
FIG. 10 is a flowchart illustrating the hand pose reconstruction method in accordance with some embodiments of the present disclosure.

In operation S370, a hand pose reconstruction method is performed. In some embodiments, operation S370 is performed by the processor 230 as illustrated in FIG. 2. Reference is made to FIG. 10 together. FIG. 10 is a flowchart illustrating the hand pose reconstruction method S370 in accordance with some embodiments of the present disclosure. The hand pose reconstruction method S370 includes operations S372 to S376.

In operation S372, a wrist position and a wrist direction of a wrist of the user are obtained according to a movement data of a tracking device wear on the wrist of the user.

Reference is made to FIG. 1 and FIG. 2 together, in some embodiments, the tracking device 130A and the tracking device 130B wear on the wrists of the user U includes an IMU (inertial measurement unit) circuit. The IMU circuit obtains the IMU data of the tracking devices 130A and 130B when the tracking devices 130A and 130B move. According to the IMU data, the movement data (including a movement vector and a rotation angle) of each of the tracking devices 130A and 130B can be calculated by the processor 230.

According to the movement data, the processor 230 calculates the wrist position and the wrist direction of the wrists of the user. For example, in an embodiments, the processor 230 obtains an initial orientation (initial direction) and an initial position of the tracking device 130A of an initial time point. The processor 230 then obtains a movement data of the tracking device 130A from the initial time point to a current time point. By adding the initial orientation and the initial position and the movement data between the initial time point and the current time point, the processor 230 obtains a position and a direction of the tracking device 130A at the current time point. The position and the direction of the current time point is then taken as the wrist position and the wrist direction of the left wrist at the current time point, in which the left wrist is wearing the tracking device 130A.

Figure 11A:
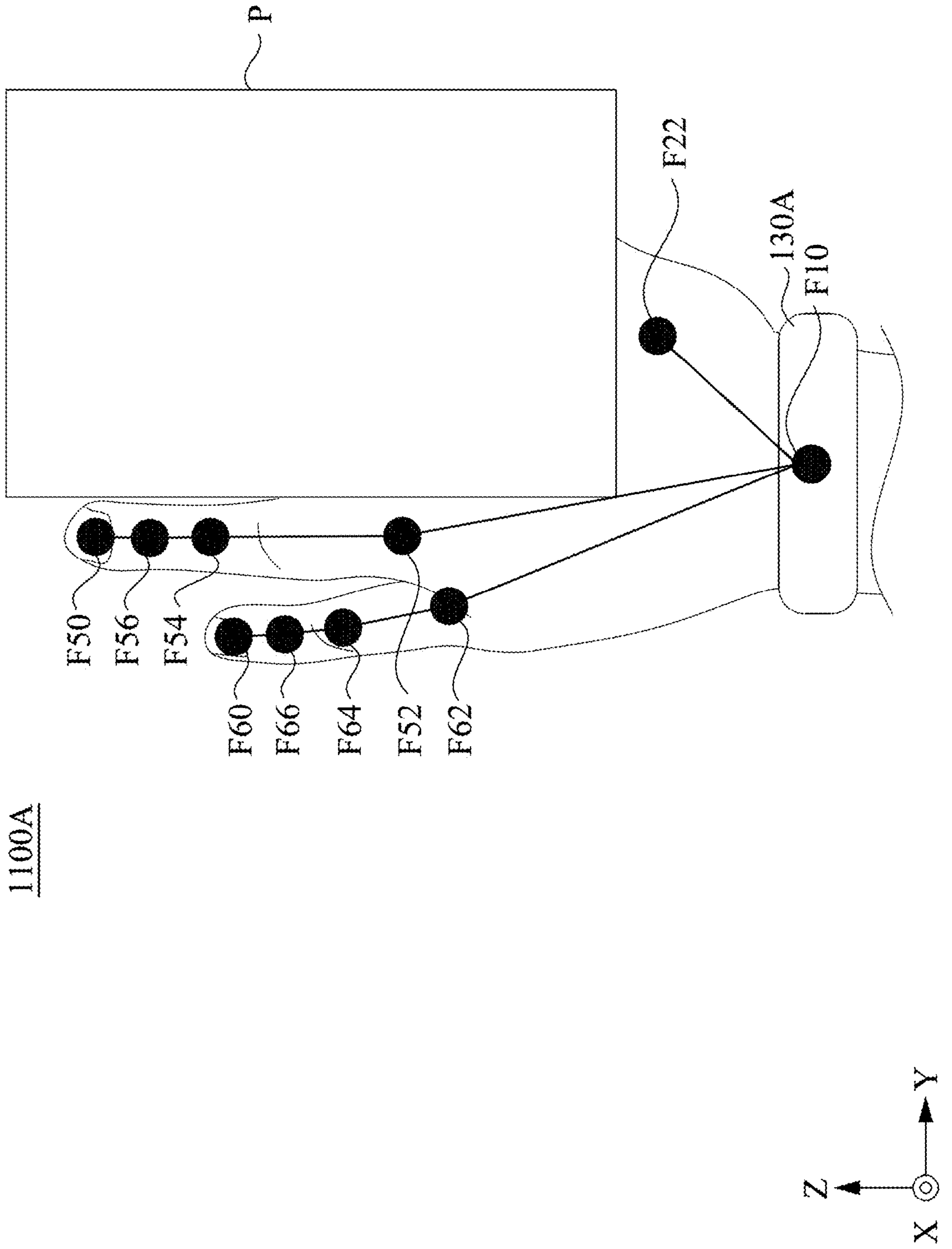
FIG. 11A is a schematic diagram illustrating a hand image of the user in accordance with some embodiments of the present disclosure.

In operation S374, several visible feature points of the hand of the user are obtained from the image. Reference is made to 11A and 11B together. FIGS. 11A and 11B are schematic diagrams illustrating hand images 1100A and 1100B of the user U in accordance with some embodiments of the present disclosure.

Reference is made to FIG. 11A. The hand image 1100A is occluded by an object P. The feature points F10, F22, F52, F54, F56, F50, F62, F64, F66, and F60 are visible feature points, while the rest of the feature points are invisible feature points.

Reference is made to FIG. 11B. In the hand image 1100B, the hand image of the left hand is occluded by the right hand and the right arm. The feature points F10, F22, F24, F28, F30, F32, F42, F52, and F56 are visible feature points, while the rest of the feature points are invisible feature points.

In some embodiments, the searching of the visible feature points is operated by searching an area surrounding the wrist position, and the position of the tracking device is taken as the wrist position. That is, the processor 230 finds the position of the tracking device 130A first, and then the processor 230 searches the area surrounding the position of the tracking device 130A to find the visible feature points according to the hand image.

In operation S376, the hand pose of the hand of the user is constructed according to several visible feature points, the wrist position and the wrist direction of the wrist, and a hand pose model.

In some embodiments, operation S376 is operated with a machine learning model ML stored in the memory 250 as illustrated in FIG. 2. The machine learning model ML constructs the hand pose of the hand of the user according to several visible feature points, the wrist position and the wrist direction of the wrist, and a hand pose model.

In some embodiments, when all of the feature points of the same finger are invisible feature points or when the feature point of the fingertip is invisible, the processor 230 constructs the hand pose of the finger with the previous hand pose. In detail, the processor 230 obtains a relationship between the finger feature points and the wrist position according to the previous hand pose, and the processor 230 maintains the relationship between the finger feature points and the wrist position of the previous hand pose so as to construct the hand pose with occluded part.

For example, reference is made to FIG. 11A together. It may be seen that in FIG. 11A, all of the feature points of the forefinger and the middle finger are invisible feature points, and the feature point of the finger tip of the thumb is an invisible feature point.

Figure 12A:
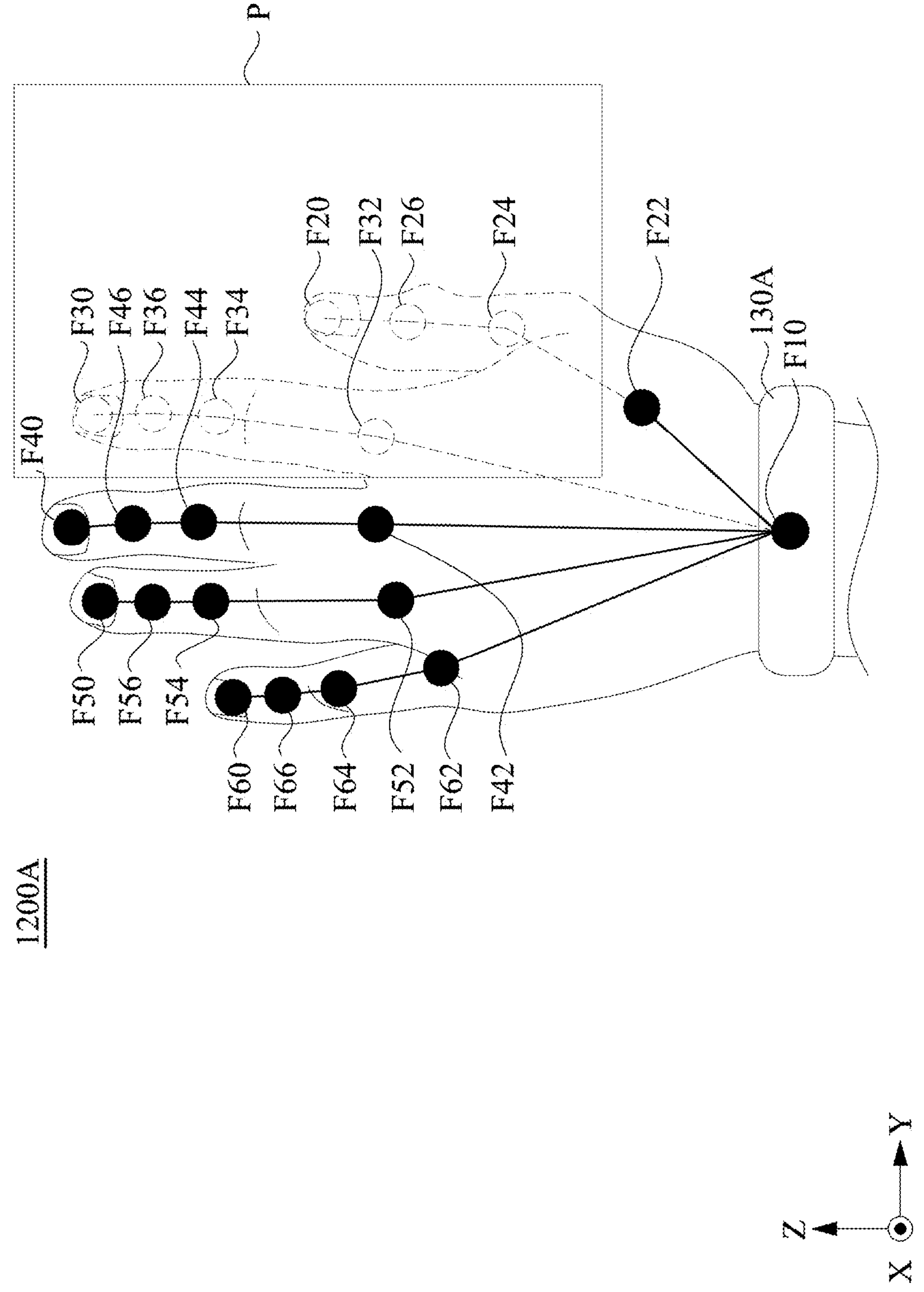
FIG. 12A is a schematic diagram illustrating a previous hand pose in accordance with some embodiments of the present disclosure.

Reference is made to FIG. 12A together. FIG. 12A is a schematic diagram illustrating a previous hand pose 1200A in accordance with some embodiments of the present disclosure. The previous hand pose 1200A is a hand pose stored previous to the time point of the hand image 1100A. The processor 230 as illustrated in FIG. 2 obtains the relationship between the finger feature points F40, F42, F44, F46, and the feature point F10 of the wrist according to the previous hand pose 1200A. The relationship between the finger feature points F40, F42, F44, F46, and the feature point F10 of the wrist includes the distances and the relative angle between each two of the finger feature points F40, F42, F44, F46, and the feature point F10.

Figure 12B:
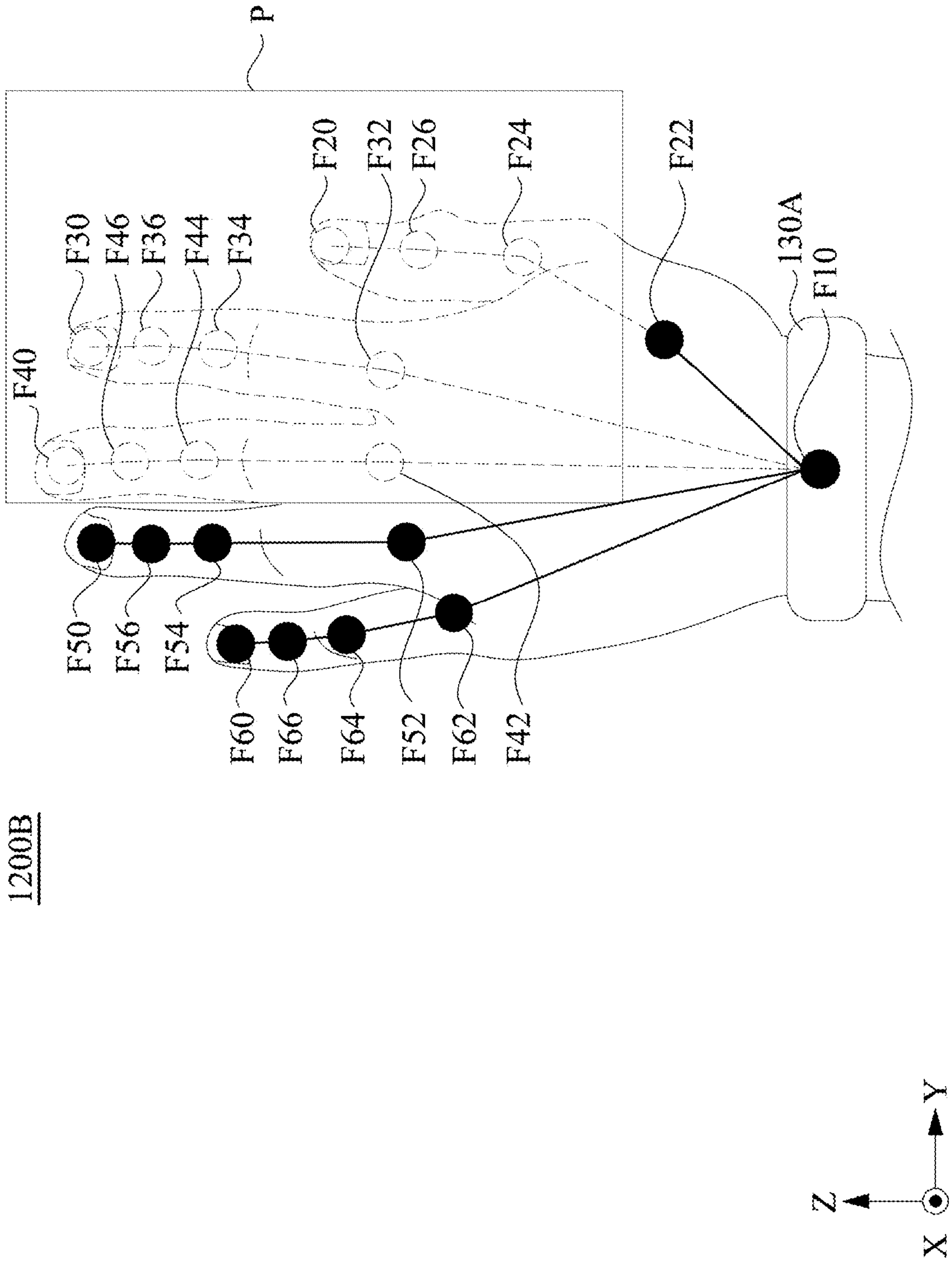
FIG. 12B is a schematic diagram illustrating a hand pose in accordance with some embodiments of the present disclosure.

Reference is made to FIG. 12B together. FIG. 12B is a schematic diagram illustrating a hand pose 1200B in accordance with some embodiments of the present disclosure. The hand pose 1200B is a hand pose constructed according to the previous hand pose 1200A and the hand image 1100A. It should be noted that the time point of the hand pose 1200B and the time point of the hand image 1100A are the same. That is, if the hand image 1100A is taken at time point tp4 (not shown), the hand pose 1200B represents the hand pose of the time point tp4.

The relationship between the finger feature points F40, F42, F44, F46, and the feature point F10 of the wrist in the hand pose 1200B are the same as the relationship between the finger feature points F40, F42, F44, F46, and the feature point F10 of the wrist in the previous hand pose 1200A. That is, the processor 230 maintains the relationship between the finger feature points F40, F42, F44, F46, and the feature point F10 of the wrist in the previous hand pose 1200A so as to construct the hand pose 1200B.

The construction of the thumb and the fore finger within the hand pose 1200B are the same as that of the middle finger and will not be described in detail here.

In some embodiments, in operation S376, according to the visible feature points, the processor 230 as illustrated in FIG. 2 estimates the estimated positions of the invisible feature points according to the visible feature points, the wrist position and the wrist direction, and the hand pose model.

Reference is made to FIG. 11B. In the hand image 1100B, the finger feature points F40 and F42 are visible feature points of the middle finger, and the finger feature points F50 and F52 are visible feature points of the ring finger.

According to the visible feature points F40, F42, the wrist position and the wrist direction of the wrist wearing the tracking device 130A and the hand pose model, the processor 230 estimates the estimated position of the invisible feature points of the middle finger, so as to construct the hand pose.

Figure 13:
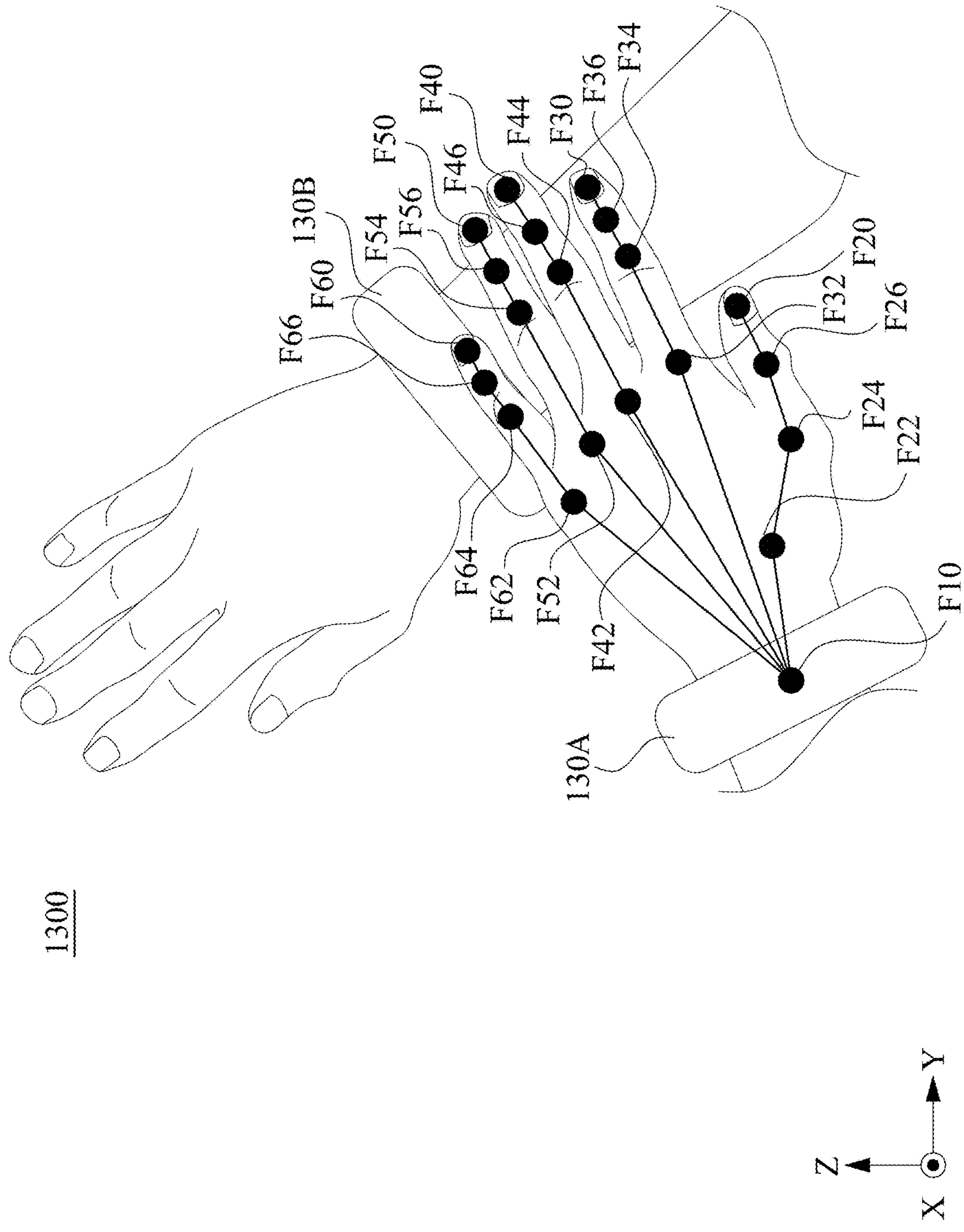
FIG. 13 is a schematic diagram illustrating a hand pose in accordance with some embodiments of the present disclosure.

Reference is made to FIG. 13. FIG. 13 is a schematic diagram illustrating a hand pose 1300 in accordance with some embodiments of the present disclosure. The hand pose 1300 is constructed according to the hand image 1100B as illustrated in FIG. 11B.

Take the hand pose of the middle finger as illustrated in FIG. 13 for example. According to different hand pose models stored in the memory 250, the processor 230 determines a relationship (including a distance and a relative angle) between the invisible feature points F44, F46, the visible feature points F40, F42, and the feature point F10 of the wrist. That is, the processor 230 selects a hand pose model stored in the memory 250, and the processor 230 takes the relationship (including a distance and a relative angle) between the invisible feature points F44, F46, the visible feature points F40, F42, and the feature point F10 of the wrist of the selected hand pose model as a reference for constructing the hand pose 1300. That is, the processor 230 takes the relationship (including a distance and a relative angle) between the invisible feature points F44, F46, the visible feature points F40, F42, and the feature point F10 of the wrist of the selected hand pose models to be the relationship (including a distance and a relative angle) between the invisible feature points F44, F46, the visible feature points F40, F42, and the feature point F10 of the wrist of the hand pose 1300.

The construction of the hand pose of the ring finger in the hand pose 1300 is similar to the hand pose of the middle finger and will not be described in detail here.

In some embodiments, the hand pose is constructed with the information of the wrist direction. Reference is made to FIG. 11A together. As illustrated in FIG. 11A, the wrist direction is +Z direction, and the palm is facing −X direction, with the information of the wrist direction, the processor 230 may construct the hand pose of the thumb, the fore finger, and the middle finger toward a reasonable direction and on a reasonable position relative to the feature F10 of the wrist.

In some embodiments, the processor 230 further construct the hand pose of the user according to a hand pose database stored in the memory 250. The hand pose database includes several normal hand poses, such as hand poses for dancing or sign language. By comparing the hand image captured to the normal hand poses of the hand pose database, the processor 230 may estimate a possible hand pose according to the positions of the visible feature points and the position of the wrist feature point, so as to construct the hand pose.

Through the operations of various embodiments described above, a hand pose construction method, an electronic device, and a non-transitory computer readable storage medium are implemented. For the hand image that is occluded, the hand pose can be predicted and constructed with the position of the tracking device and the visible feature points of the hands. Moreover, the movement of the arms of the user can be predicted by detecting the position of the head and the wrist of the user, and the hand self-occlusion status can be predicted in advance so as to store the image of the hand pose before the hand image is occluded. For applications such as dance or sign language, there are many self-occlusion case, the embodiments of the present disclosure can help to predict more stable hand pose by predicting the movement of the arms. Furthermore, in applications such as dance or sign language, there are known data sets are database for classifying and recognizing the normal hand poses or movements, the embodiments of the present disclosure can predict the occluded hand poses more correctly according to the database. The movement of the arms are calculated according to the positions of the wrists and the position of the head of the user, and other time consuming algorithm (for example, object detection model for detecting the arms) are not needed, which reduce the amount of calculation of the processor.

The embodiments of the present disclosure make the construction of the hand poses more stable when the hand image is occluded. Thereby, the hand interactions can be shown perfectly in the UI/UX, and the hand poses can be displayed on the screen and the user experience can be increased. Moreover, with auto detection and prediction of the hand image being occluded by the hand or arm of the user, the hand image can be stored previous to the hand image being occluded, and the hand construction is more stable and accurate.

It should be noted that in the operations of the above-mentioned hand pose construction method 300, no particular sequence is required unless otherwise specified. Moreover, the operations may also be performed simultaneously or the execution times thereof may at least partially overlap.

Furthermore, the operations of the hand pose construction method 300 may be added to, replaced, and/or eliminated as appropriate, in accordance with various embodiments of the present disclosure.

Various functional components or blocks have been described herein. As will be appreciated by persons skilled in the art, the functional blocks will preferably be implemented through circuits (either dedicated circuits, or general purpose circuits, which operate under the control of one or more processing circuits and coded instructions), which will typically include transistors or other circuit elements that are configured in such a way as to control the operation of the circuitry in accordance with the functions and operations described herein.

Although the present disclosure has been described in considerable detail with reference to certain embodiments thereof, other embodiments are possible. Therefore, the scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A hand pose construction method, comprising:

capturing an image of a hand of a user from a viewing angle of a camera, wherein a hand image of the hand of the user is occluded within the image;

obtaining a wrist position and a wrist direction of a wrist of the user according to a movement data of a tracking device worn on the wrist of the user;

obtaining a plurality of visible feature points of the hand of the user from the image; and constructing a constructed hand pose of the hand of the user under occlusion in the image according to the plurality of visible feature points, the wrist position, the wrist direction, and a selected hand pose model stored in a memory, comprising:

determining, according to the selected hand pose model, a relationship among a wrist feature point, at least one visible feature point, and at least one invisible feature point, wherein the relationship comprises a plurality of distances and a plurality of relative angles between the wrist feature point, the at least one visible feature point, and the at least one invisible feature point; and estimating an estimated position of the at least one invisible feature point according to the at least one visible feature point obtained from the image, the wrist position and the wrist direction, and the relationship defined in the selected hand pose model;

wherein the relationship between the wrist feature point, the at least one visible feature point, and the at least one invisible feature point in the constructed hand pose corresponds to the relationship defined in the selected hand pose model.

2. The hand pose construction method of claim 1, further comprising:

predicting that the hand of the user is about to be occluded;

storing a previous hand pose of the hand of the user in response to the hand of the user being about to be occluded; and constructing the constructed hand pose of the hand of the user with the previous hand pose.

3. The hand pose construction method of claim 2, further comprising:

constructing an arm skeleton of two arms of the user according to another wrist position of another hand of the user, the wrist position of the hand of the user, and a head position of the user;

obtaining a plurality of arm positions of a plurality of arm feature points of the user of a plurality of time points according to the arm skeleton; and predicting the hand image is about to be occluded according to the plurality of arm positions of the plurality of arm feature points and the arm skeleton.

4. The hand pose construction method of claim 2, wherein a finger of the hand comprises a plurality of finger feature points, wherein a first finger feature point of the plurality of finger feature points is located at a fingertip of the finger, wherein the hand pose construction method further comprises:

constructing the constructed hand pose of the finger of the user with the previous hand pose in response to the plurality of finger feature points being a plurality of invisible feature points or in response to the first finger feature point being one of the plurality of invisible feature points.

5. The hand pose construction method of claim 4, further comprising:

obtaining a relationship between the plurality of finger feature points and the wrist position of the previous hand pose; and maintaining the relationship between the plurality of finger feature points and the wrist position during an operation of reconstructing the constructed hand pose.

6. The hand pose construction method of claim 1, further comprising:

determining to reconstruct the constructed hand pose of the hand of the user according to a number of the plurality of visible feature points, an occlusion percentage of the hand, or a significance of a plurality of invisible feature points.

7. The hand pose construction method of claim 1, further comprising:

reconstructing the constructed hand pose according to a hand pose database, wherein the hand pose database comprises a plurality of normal hand poses.

8. An electronic device, comprising:

a camera, configured to capture an image of a hand of a user from a viewing angle of the camera, wherein a hand image of the hand of the user is occluded within the image; and a processor, coupled to the camera, wherein the processor is configured to:

obtain a wrist position and a wrist direction of a wrist of the user according to a movement data of a tracking device worn on the wrist of the user;

obtain a plurality of visible feature points of the hand of the user from the image; and construct a constructed hand pose of the hand of the user under occlusion in the image according to the plurality of visible feature points, the wrist position, the wrist direction, and a selected hand pose model stored in a memory, comprises:

determining, according to the selected hand pose model, a relationship among a wrist feature point, at least one visible feature point, and at least one invisible feature point, wherein the relationship comprises a plurality of distances and a plurality of relative angles between the wrist feature point, the at least one visible feature point, and the at least one invisible feature point; and estimating an estimated position of the at least one invisible feature point according to the at least one visible feature point obtained from the image, the wrist position and the wrist direction, and the relationship defined in the selected hand pose model;

wherein the relationship between the wrist feature point, the at least one visible feature point, and the at least one invisible feature point in the constructed hand pose corresponds to the relationship defined in the selected hand pose model.

9. The electronic device of claim 8, wherein the processor is further configured to:

predict that the hand of the user is about to be occluded;

store a previous hand pose of the hand of the user in response to the hand of the user being about to be occluded; and construct the constructed hand pose of the hand of the user with the previous hand pose.

10. The electronic device of claim 9, wherein the processor is further configured to:

construct an arm skeleton of two arms of the user according to another wrist position of another hand of the user, the wrist position of the hand of the user, and a head position of the user;

obtain a plurality of arm positions of a plurality of arm feature points of the user of a plurality of time points according to the arm skeleton; and predict the hand image is about to be occluded according to the plurality of arm positions of the plurality of arm feature points and the arm skeleton.

11. The electronic device of claim 9, wherein a finger of the hand comprises a plurality of finger feature points, wherein a first finger feature point of the plurality of finger feature points is located at a fingertip of the finger, wherein the processor is further configured to:

construct the constructed hand pose of the finger of the user with the previous hand pose in response to the plurality of finger feature points being a plurality of invisible feature points or in response to the first finger feature point being one of the plurality of invisible feature points.

12. The electronic device of claim 11, wherein the processor is further configured to:

obtain a relationship between the plurality of finger feature points and the wrist position of the previous hand pose; and maintain the relationship between the plurality of finger feature points and the wrist position during an operation of reconstructing the constructed hand pose.

13. The electronic device of claim 8, wherein the processor is further configured to:

determine to reconstruct the constructed hand pose of the hand of the user according to a number of the plurality of visible feature points, an occlusion percentage of the hand, or a significance of a plurality of invisible feature points.

14. The electronic device of claim 8, wherein the processor is further configured to:

reconstruct the constructed hand pose according to a hand pose database, wherein the hand pose database comprises a plurality of normal hand poses.

15. A non-transitory computer readable storage medium, wherein the non-transitory computer readable storage medium comprises one or more computer programs stored therein, and the one or more computer programs can be executed by one or more processors so as to be configured to operate a hand pose construction method, wherein the hand pose construction method comprises:

capturing an image of a hand of a user from a viewing angle of a camera, wherein a hand image of the hand of the user is occluded within the image;

obtaining a wrist position and a wrist direction of a wrist of the user according to a movement data of a tracking device worn on the wrist of the user;

obtaining a plurality of visible feature points of the hand of the user from the image; and constructing a constructed hand pose of the hand of the user under occlusion in the image according to the plurality of visible feature points, the wrist position, the wrist direction, and a selected hand pose model stored in a memory, comprising:

determining, according to the selected hand pose model, a relationship among a wrist feature point, at least one visible feature point, and at least one invisible feature point, wherein the relationship comprises a plurality of distances and a plurality of relative angles between the wrist feature point, the at least one visible feature point, and the at least one invisible feature point; and estimating an estimated position of the at least one invisible feature point according to the at least one visible feature point obtained from the image, the wrist position and the wrist direction, and the relationship defined in the selected hand pose model;

wherein the relationship between the wrist feature point, the at least one visible feature point, and the at least one invisible feature point in the constructed hand pose corresponds to the relationship defined in the selected hand pose model.

16. The non-transitory computer readable storage medium of claim 15, wherein the hand pose construction method further comprises:

predicting the hand of the user is about to be occluded;

storing a previous hand pose of the hand of the user in response to the hand of the user being about to be occluded; and constructing the constructed hand pose of the hand of the user with the previous hand pose.

17. The non-transitory computer readable storage medium of claim 15, wherein the hand pose construction method further comprises:

reconstructing the constructed hand pose according to a hand pose database, wherein the hand pose database comprises a plurality of normal hand poses.

* * * * *